UNITED STATES PATENT OFFICE.

GEORGE F. WHITNEY, OF SOUTH ORANGE, NEW JERSEY, ASSIGNOR TO WHITNEY YEAST CORPORATION, OF NEW YORK, N. Y., A CORPORATION OF NEW YORK.

DRY YEAST AND PROCESS OF MAKING THE SAME.

1,306,569.   Specification of Letters Patent.   Patented June 10, 1919.

No Drawing.   Application filed October 24, 1918.   Serial No. 259,536.

*To all whom it may concern:*

Be it known that I, GEORGE F. WHITNEY, a citizen of the United States, and resident of South Orange, in the county of Essex and State of New Jersey, have invented certain new and useful Improvements in Dry Yeast and Processes of Making the Same, of which the following is a specification.

This invention relates to a new form of dry yeast and to a process of preparing the same.

At the present time there are on the market two forms of products designated by the name of yeast and used to produce vesiculation by fermentation of dough. These products are compressed yeast which is liquid yeast from which the greater portion of the moisture has been removed by subjecting it to the action of a centrifugal and filter press. The second product called yeast is in reality a leaven or sour dough which has been dried so thoroughly that it keeps well in all kinds of weather. Such a product occurs in the form of dry hard cakes or pieces and is commercially known as magic yeast, yeast foam, and twin brothers yeast, etc. Such a product usually contains a large amount of lactic acid and some acetic acid and during fermentation it produces a large amount of lactic acid and carbonic acid and renders the dough sour, thereby also producing a sour bread. This ferment may also be used to first ferment a portion of the flour used and which is called sponge. Although only containing a very small percentage of live yeast cells, only from one to three per cent. of the total micro-organisms, the yeast cells develop much faster in the sponge than the lactic acid organisms, with the result that if a portion of the fresh sponge is used in place of yeast a bread is produced which is much less sour than the bread formed when no sponge is used. The advantage of this fermentation product is that no refrigeration is needed to keep it.

A third form of ferment has been invented and patented but has not yet become a commercial product to any considerable extent. This is a true yeast in a dry form. Like the dry leaven or sour dough it has the advantage that it needs no refrigeration. Its use, however, is connected with serious practical difficulties, such as bad flavor and great perishability of the yeast cells, difficulties which up to applicant's invention have not been overcome in any country. Applicant's present invention belongs to this class of true dry yeast. As far as flavor is concerned it is superior to any other bread ferment. It will keep easily for more than three months and seems at last to be the solution of an extremely difficult problem within the art of panification. After this preliminary statement of the object and nature of the invention the latter will now be explained in detail by some examples and set forth in the appended claims.

To carry out this process most of the moisture is first removed from liquid yeast. This is done by subjecting the liquid yeast to the action of a centrifugal or a filter press or both. As it comes from the filter press the yeast carries about 80% of moisture and is still sensibly wet. This is well known in the art of yeast making as hitherto practised. To the wet yeast produced as above is then added soluble and insoluble substances suitable as yeast food.

Available soluble substances are such as dextrin, glucose, malt, maltose and sugar.

Subsequently insoluble food substances, to serve as a vehicle or carrier, may be added, such as starch, flour, meal and ground nitrogenous seeds. The soluble ingredients in proportion to about 10 to 30% of the yeast are first mixed with the wet yeast, the material being maintained at a low temperature to prevent fermentation, preferably 40 to 45 degrees F., for which purpose artificial refrigeration may be resorted to. The soluble ingredients, being first added, are taken up by the yeast cells to the limit of their capacity, producing a cell rich in protoplasmic material of maximum strength or ability. The insoluble ingredient, or ingredients, is then incorporated with the mixture. The amount of these insoluble ingredients may vary greatly but for commercial purposes the more common range is about 20% to 50% of the weight of the wet yeast. When all the insoluble ingredients have been incorporated, the material, while still wet and still cool, is agitated either by being passed through sieves of successively diminished mesh, or by revolution in a drum provided with movable and stationary fingers, or in any other convenient way, The agitation is usually continued until the material is converted into small particles resembling coarse meal, but may be stopped as soon as all large lumps have disappeared. All of these operations should be carried out in a cool environment, and in warmer climates or where a longer time is used, artificial refrigeration down to 45 degrees F., or thereabouts, may be profitably employed. The granulated material is then rapidly dried in a current of heated air, preferably at a temperature of 120 degrees F. with an approximate limitation of substantially 20 degrees on either side. In order to hasten the drying, the granules to be dried are preferably kept in motion by agitation or revolution while a current of air is passed through the vessel, drum, or other chamber in which the action takes place. In the beginning of the drying operation the temperature of the air will be rapidly lowered, due to rapid evaporation of the moisture, but the continuation of the heated air current prevents this cooling from proceeding too far.

The drying as effected in this way extracts the moisture, or as much thereof as is desired, from the cell by a process of endosmosis through the cell wall.

The presence of the unabsorbed soluble and the insoluble foods added to the wet yeast, by forming a coating, protects the yeast cells while the drying is effected, which may be done in from ten minutes to two and one half hours. I prefer, however, to effect the drying as rapidly as possible. The result of these operations is that the enzyms and vital principles of the yeast are retained and are not destroyed by the process. The presence of the insoluble ingredients also prevents the granulated particles from becoming hard and horny. The presence of the large percentage of water soluble ingredients makes the yeast mass produced in this way disintegrate very rapidly when added to water whereupon it assumes the condition of ordinary liquid yeast skimmed off from a fermented mash, and which has never been desiccated, in which 60% or more of the yeast cells are viable.

The drying of the yeast renders it dormant. When, however, the yeast is required to subsequently perform its work the thin layer of readily available soluble material quickly takes up moisture and also acts as a medium in which the yeast cells may and will grow and propagate, and thus assists the recuperation of the cells to a marked degree so that the yeast acquires its maximum activity very quickly.

In place of the soluble carbohydrates or in admixture therewith, soluble proteids such as gluten, legumin, albumen, gelatin, peptone, etc., may also be employed.

In place of disintegrating the mass after the insoluble ingredients have been incorporated, the mass of yeast with the soluble and insoluble ingredients incorporated therewith may be subjected to refrigeration in a quiescent state for a period that may be varied from two to five hours and at a temperature around 40 to 50 degrees, or any lower point above the freezing point. After this refrigeration the disintegration and drying are carried on as has been described.

As a result of the contact with the current of air, this yeast is to a large extent deodorized and therefore carries decidedly less odor than any other yeast as far as known.

The yeast when prepared ready for the market usually contains from 2 to 12 per cent. of moisture. In no case should the moisture be allowed to exceed 15 per cent. because if it does, putrefactive fermentation will set in, if it is kept in warm surroundings.

I claim:

1. The process of making a dry yeast which consists in mixing with wet yeast soluble and insoluble substances suitable as yeast foods, disintegrating the mixture by agitation while wet and rapidly drying the disintegrated material by a current of heated air to remove moisture to prevent putrefaction and to produce a material in which the major portion substantially of the yeast cells are viable.

2. The process of making a dry yeast which consists in mixing with wet yeast soluble and insoluble substances suitable as yeast foods, disintegrating the mixture by agitation while wet and rapidly drying the disintegrated material by a current of air heated to a temperature of 120 degrees F. with an approximate limitation of 20 degrees F. on either side.

3. A dried yeast substantially free from acid ferments consisting essentially of live yeast cells and soluble and insoluble yeast food materials and in which the moisture content does not exceed 15% by weight and in which a major portion substantially of the yeast cells are viable.

4. A dried yeast substantially free from acid ferments, consisting essentially of live yeast cells and soluble yeast food material and insoluble carbohydrates serving as yeast food, and in which the moisture content does not exceed 15% by weight and in which a major portion, substantially, of the yeast cells are viable.

5. A dried yeast substantially free from acid ferments consisting essentially of live yeast cells and soluble and insoluble carbohydrates serving as yeast food, and in which the moisture content does not exceed 15% by weight and in which a major portion, substantially, of the yeast cells are viable.

6. A dried yeast substantially free from acid ferments, consisting essentially of live yeast cells and dextrin and insoluble carbohydrates serving as yeast food, and in which the moisture content does not exceed 15% by weight, and in which a major portion, substantially, of the yeast cells are viable.

7. A dried yeast substantially free from acid ferments consisting essentially of live yeast cells and dextrin and starch serving as yeast food, and in which the moisture content does not exceed 15% by weight, and in which a major portion, substantially, of the yeast cells are viable.

Signed at New York, in the county of New York and State of New York, this 22nd day of October, A. D. 1918.

GEORGE F. WHITNEY.